(12) United States Patent
Lowell et al.

(10) Patent No.: US 11,850,581 B2
(45) Date of Patent: Dec. 26, 2023

(54) SYSTEMS AND METHODS FOR MITIGATING POLYMER FOULING

(71) Applicant: CHEVRON PHILLIPS CHEMICAL COMPANY LP, The Woodlands, TX (US)

(72) Inventors: Jeffrey S. Lowell, Huffman, TX (US); Kenneth A. Dooley, Porter, TX (US); Ran Li, Orange, TX (US); Darius Aruho, Orange, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/650,409

(22) Filed: Feb. 9, 2022

(65) Prior Publication Data
US 2022/0266211 A1    Aug. 25, 2022

Related U.S. Application Data

(60) Provisional application No. 63/147,911, filed on Feb. 10, 2021.

(51) Int. Cl.
| | | |
|---|---|---|
| *B01J 8/18* | (2006.01) | |
| *C08F 2/00* | (2006.01) | |
| *C08F 2/01* | (2006.01) | |

(52) U.S. Cl.
CPC .......... *B01J 8/1809* (2013.01); *B01J 8/1872* (2013.01); *C08F 2/005* (2013.01); *C08F 2/01* (2013.01)

(58) Field of Classification Search
USPC ............................................. 526/68, 83, 84
See application file for complete search history.

(56) References Cited

U.S. PATENT DOCUMENTS

| | | | |
|---|---|---|---|
| 4,803,251 A | 2/1989 | Goode | |
| 5,625,012 A | 4/1997 | Hussein | |
| 7,332,070 B2 * | 2/2008 | Nishida | ............. C08F 10/00 203/64 |
| 9,637,570 B2 | 5/2017 | Towles | |
| 2004/0236040 A1 * | 11/2004 | Mihan | ............. C08F 10/00 526/901 |

OTHER PUBLICATIONS

Adeka Surface Active Agents, Surfactants Products List, 16 pages (undated).*

(Continued)

*Primary Examiner* — Fred M Teskin
(74) *Attorney, Agent, or Firm* — Eversheds Sutherland (US) LLP (57) ABSTRACT

Techniques and systems for reducing fouling in a polymerization system are described. The polymerization system includes a reactor coupled to a recycle system. The recycle system includes at least one fouling-susceptible unit. The technique includes inducing polymerization of a reactant, for example, at least one olefin monomer reactant, with a catalyst in the reactor. The technique may further include circulating a fluidizing stream through the reactor and the at least one fouling-susceptible unit. The fluidizing stream may include entrained particles tending to foul the at least one fouling-susceptible unit. The technique can further include contacting the fluidizing stream with a catalyst poison at at least one location upstream of the at least one fouling-susceptible unit in the recycle system.

20 Claims, 4 Drawing Sheets

(56) References Cited

OTHER PUBLICATIONS

International Search Report and Written Opinion issued in corresponding application No. PCT/US2022/015745, dated May 6, 2022, 12 pp.
IUPAC Compendium of Chemical Terminology, 2nd Ed. 1997, pp. 1-1670.

* cited by examiner

SYSTEMS AND METHODS FOR MITIGATING POLYMER FOULING

CROSS-REFERENCE TO RELATED APPLICATIONS

This application claims the benefit of U.S. Provisional Application No. 63/147,911 filed on Feb. 10, 2021, which is incorporated herein in its entirety by reference.

TECHNICAL FIELD

This disclosure relates to systems and methods for mitigating polymer fouling, for example, fouling in polymer reactors and polymerization systems.

BACKGROUND

Polymers may be produced by polymerization of monomers and co-monomers, for example, using reactors coupled to a recycle system in a polymerization system. Such systems may be susceptible to polymer fouling, for example, via retention or deposition of polymer particles or coatings on surfaces and interfaces of system components.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In aspects, this disclosure describes techniques for reducing fouling in a polymerization system. The polymerization system includes a reactor coupled to a recycle system. The recycle system includes at least one fouling-susceptible unit. In an aspect, the technique includes inducing polymerization of a reactant, for example, at least one olefin monomer reactant, with a catalyst in the reactor. The technique may further include circulating a fluidizing stream through the reactor and the at least one fouling-susceptible unit of the recycle system. The fluidizing stream may include entrained particles, for example, polymer or catalyst particles or fines from the reactor. The technique can further include contacting the fluidizing stream with a catalyst poison at at least one location upstream of the at least one fouling-susceptible unit in the recycle system.

In aspects, this disclosure describes techniques for reducing fouling in a polymerization system. The polymerization system can include a fluidized bed reactor coupled to a recycle system. When a fluidizing stream is circulated through the fluidized bed reactor for fluidizing the contents of the reactor, fines comprising polymer and catalyst may be entrained in the exiting fluidizing stream and circulated throughout the gas recycle system. These entrained particles tend to foul least one fouling-susceptible unit in the recycle system. In an aspect, the technique includes inducing polymerization of a reactant with a catalyst in the fluidized bed reactor. The technique may further include circulating the fluidizing stream through the fluidized bed reactor and the at least one fouling-susceptible unit. The technique can further include contacting the entrained particles with a catalyst poison in at least one location upstream of the at least one fouling-susceptible unit in the recycle system.

In an aspect, for example, this disclosure describes polymerization systems exhibiting reduced fouling. In an aspect, a polymerization system includes a reactor comprising a catalyst, the reactor being configured to induce polymerization of a reactant with the catalyst. The polymerization system may further include a recycle system including at least one fouling-susceptible unit. The recycle system is coupled to the reactor. The recycle system is configured to circulate a fluidizing stream through the reactor and the at least one fouling-susceptible unit. The fluidizing stream includes entrained particles, for example, originating from the reactor. The polymerization system further includes at least one catalyst poison injection location in the recycle system and upstream of the fouling-susceptible unit.

In another aspect, for example, this disclosure describes polymerization systems which can exhibit reduced fouling. In an aspect, a polymerization system includes a fluidized bed reactor including a catalyst. The fluidized bed reactor is configured to induce polymerization of a reactant with the catalyst. The polymerization system may include a recycle system including at least one fouling-susceptible unit. The recycle system is coupled to the fluidized bed reactor. The recycle system is configured to circulate a fluidizing stream through the fluidized bed reactor and the at least one fouling-susceptible unit. The fluidizing stream includes entrained polymer and catalyst particles, for example, originating from the fluidized bed reactor, and tending to foul the at least one fouling-susceptible unit. The polymerization system includes at least one catalyst poison injection location in the recycle system and upstream of the fouling-susceptible unit.

This summary and the following detailed description provide examples and are explanatory only of the disclosure. Accordingly, the foregoing summary and the following detailed description should not be considered to be restrictive. Additional features or variations thereof can be provided in addition to those set forth herein, such as for example, various feature combinations and sub-combinations of these described in the detailed description.

BRIEF DESCRIPTION OF THE DRAWINGS

The following figures form a part of the present disclosure and are included to further demonstrate certain aspects of the present invention. The invention may be better understood by reference to one or more of these figures in combination with the detailed description of the specific embodiments presented herein.

While the inventions disclosed herein are susceptible to various modifications and alternative forms, only a few specific aspects have been shown by way of example in the drawings and are described in detail below. The figures and detailed descriptions of these specific aspects are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

It is to be understood that the disclosure is not limited in its application to the details of construction and the arrangement of components set forth in the following description or illustrated in the drawings.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso. As a representative example, if Applicant discloses in an aspect of the disclosure that a weight percentage can be from about 1% by weight to about 10% by weight, this range should be interpreted as encompassing about 1%, about 2%, about 3%, about 4%, about 5%, about 6%, about 7%, about 8%, about 9%, and about 10% by weight, as well as any ranges between any of these numbers.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference that Applicant may be unaware of at the time of the filing of the application.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

The present disclosure generally relates to systems and methods for mitigating polymer fouling, for example, fouling in polymer reactors and polymerization systems.

In the gas-phase or fluidized polymerization processes, a fluidizing stream (for example, a stream of a fluidizing gas) can entrain and carry active polymer fines and catalyst particles out of the reactor. These polymer fines and catalyst particles may adhere to downstream piping or components, the fluidizing compressor, main loop heat exchangers, or a liquid separation or recovery system, and the like. Since some of the downstream equipment is exposed to a hydrocarbon-rich environment at temperatures and pressures conducive to promote polymerization, the adhered particles may grow resulting in fouling of the equipment. Fouling may be associated with a loss in cooling or heat transfer, or an increase in pressure drop.

Further, polymer build up on piping or other internal surfaces can get released as sheets and plug downstream equipment. For example, the inlet tube sheet for main loop heat exchangers in gas-phase processes is very susceptible to both these mechanisms for fouling and plugging. The conventional solution used by polymer producers is to shut down the reactor and physically clean this equipment. Such down time results in lost production. Cleaning is generally performed by hydro-blasting or other techniques.

Inhibiting the growth of these polymer particles through the use of a catalyst poison may increase the run time on this equipment before fouling necessitates the need for a reactor outage to physically clean this equipment.

Polymer catalyst poison may be used to inhibit or reduce the growth of polymer that adheres to in-line process equipment and piping. In embodiments, a reactor poison such as oxygen may be used to deactivate activity of any polymer that is entrained in the fluidizing gas as it leaves the polymerization reactor. More specifically, the poison could be used to deactivate any polymer particles that adhere to the tube sheet of a main loop heat exchanger, recycle system piping, or recycle liquid pumps.

For example, a low level of polymer catalyst poison may be injected downstream of the polymerization reactor but upstream of any equipment/piping susceptible to polymer fouling. The poison will disperse in the fluidizing gas deactivating any entrained polymer and catalyst particles. Any particles that adhere to downstream equipment such as piping, exchangers, compressors and pumps will not grow because they have been deactivated. Moreover, no further process step may be required to remove the poison, depending on the level of poison used, that is, the concentration, rate of addition, or quantity of poison used.

If a balance between the level of poison injected post reactor is equivalent to active polymer circulating in the recycle system, the poison could be consumed before reaching the reactor resulting in minimal loss of reactor activity and catalyst productivity.

The use of a polymer catalyst poison to reduce equipment fouling and extend run time between turnarounds to clean equipment is counter intuitive because in general operations works to keep poisons out of the reactor system. Invention will use a reactor poison to inhibit the growth of any polymer fines that leave the reactor.

Conventional techniques have primarily focused on either collecting entrained particles through the use of a cyclone, strainer baskets/filters to collect fines, and/or over designing equipment to allow for increased level of fouling to extend run time between turnaround to perform equipment cleanings or installation of spare equipment. Thus, the systems and techniques of the present disclosure provide certain advantages.

For example, overall duration of turnarounds to clean the fouled equipment could be reduced due to easier cleanup of equipment. Less fouling would result in lower downtime of equipment, and lower frequency of cleaning. Further advantages include increased production due to higher on-stream time.

During events in which the reactor is "idled" or suspended due to issues with the degassing system or the finishing area, a relatively higher amount of reactor poison may be injected into the gas system to deactivate any adhered polymer particles during these downtime events. Since the reactor is suspended, the higher level of catalyst poisons will not impact production. The poison could then be purged from the gas system prior to restart of the reactor.

Thus, systems and techniques according to the present disclosure may reduce, inhibit, or substantially prevent fouling in polymerization systems.

In aspects, this disclosure describes techniques for reducing fouling in a polymerization system. The polymerization system includes a reactor coupled to a recycle system. The recycle system includes at least one fouling-susceptible unit. In an aspect, the technique includes inducing polymerization of a reactant, for example, at least one olefin monomer reactant, with a catalyst in the reactor. The technique may further include circulating a fluidizing stream through the reactor and the at least one fouling-susceptible unit of the recycle system. The fluidizing stream may include entrained particles, for example, polymer or catalyst particles or fines from the reactor. The technique can further include contacting the fluidizing stream with a catalyst poison at at least one location upstream of the at least one fouling-susceptible unit in the recycle system.

In aspects, this disclosure describes techniques for reducing fouling in a polymerization system. The polymerization system can include a fluidized bed reactor coupled to a recycle system. When a fluidizing stream is circulated through the fluidized bed reactor for fluidizing the contents of the reactor, fines comprising polymer and catalyst may be entrained in the exiting fluidizing stream and circulated throughout the gas recycle system. These entrained particles tend to foul least one fouling-susceptible unit in the recycle system. In an aspect, the technique includes inducing polymerization of a reactant with a catalyst in the fluidized bed reactor. The technique may further include circulating the fluidizing stream through the fluidized bed reactor and the at least one fouling-susceptible unit. The technique can further include contacting the entrained particles with a catalyst poison in at least one location upstream of the at least one fouling-susceptible unit in the recycle system.

In an aspect, for example, this disclosure describes polymerization systems exhibiting reduced fouling. In an aspect, a polymerization system includes a reactor comprising a catalyst, the reactor being configured to induce polymerization of a reactant with the catalyst. The polymerization system may further include a recycle system including at least one fouling-susceptible unit. The recycle system is coupled to the reactor. The recycle system is configured to circulate a fluidizing stream through the reactor and the at least one fouling-susceptible unit. The fluidizing stream includes entrained particles, for example, originating from the reactor. The polymerization system further includes at least one catalyst poison injection location in the recycle system and upstream of the fouling-susceptible unit.

In another aspect, for example, this disclosure describes polymerization systems which can exhibit reduced fouling. In an aspect, a polymerization system includes a fluidized bed reactor including a catalyst. The fluidized bed reactor is configured to induce polymerization of a reactant with the catalyst. The polymerization system may include a recycle system including at least one fouling-susceptible unit. The recycle system is coupled to the fluidized bed reactor. The recycle system is configured to circulate a fluidizing stream through the fluidized bed reactor and the at least one fouling-susceptible unit. The fluidizing stream includes entrained polymer and catalyst particles, for example, originating from the fluidized bed reactor, and tending to foul the at least one fouling-susceptible unit. The polymerization system includes at least one catalyst poison injection location in the recycle system and upstream of the fouling-susceptible unit.

Figure 1:
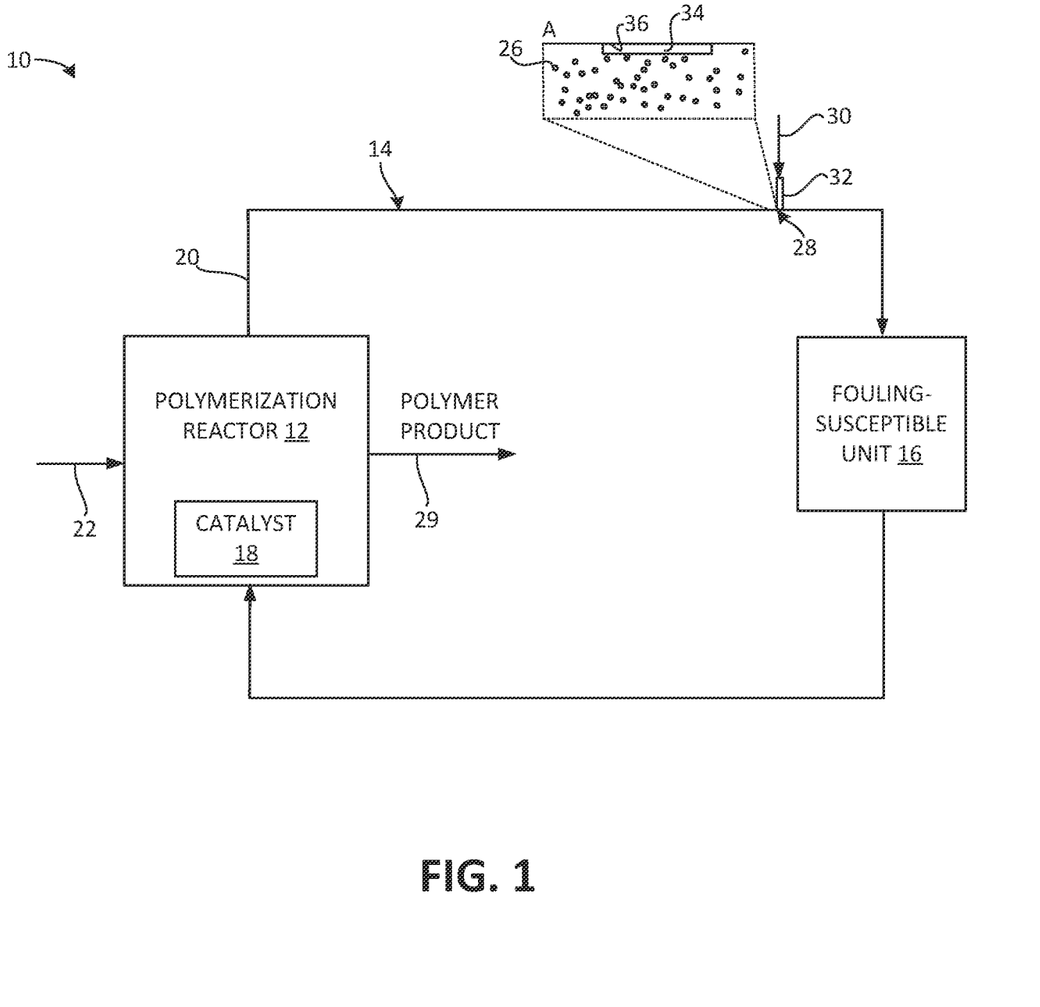
FIG. 1 is a conceptual block diagram of a polymerization system including a reactor coupled to a recycle system including a fouling-susceptible unit.

Turning now to the figures, FIG. 1 is a conceptual block diagram of a polymerization system 10 including a reactor 12 coupled to a recycle system 14 including a fouling-susceptible unit 16.

Reactor 12 may be any suitable reactor useful for polymerization. In embodiments, reactor 12 is a fluidized bed reactor. Reactor 12 includes a catalyst 18 which can form a fluidized bed when the polymerization reactor is in operation. For example, a fluidizing stream 20 may be circulated through reactor 12 and recycle system 14 for fluidizing the contents of reactor 12. Reactor 12 is configured to induce polymerization of a reactant with catalyst 18.

The reactant may be introduced in one or more streams, and may include fresh reactant or recycled reactant. For example, the reactant may be introduced through fresh reactant stream 22, for example, introduced in an inlet of reactor 12. The reactant may include at least one olefin monomer reactant. The reactant may include unreacted fresh monomer, co-monomers, or partially-reacted polymers. For example, when reactor 12 is initially brought online, the reactant may substantially include only fresh monomer, and as the polymerization reaction proceeds, partially-reacted polymers may be formed by reactor 12 and recirculated to reactor 12 through recycle system 14. The monomer may consist of a single species, or more than one species, for example, one or more polymerizable monomers. As operation of reactor 12 continues, polymer chains formed from the monomers and partially-reacted polymers continue to grow in reactor 12. In embodiments, product stream 29 is continuously or continually removed from reactor 12. Product stream 29 may be treated further, for example, in a degassing system, to obtain a polymer product.

Fluidizing stream 20 includes a suitable fluidizing medium, for example, a fluidizing gas. Fluidizing stream 20 may be introduced in reactor 12 to fluidize the contents of reactor 12. Fluidizing stream 20 may be introduced at any suitable location in reactor 12. In embodiments, a fluidized bed is located adjacent a base of reactor 12, and fluidizing stream 20 is introduced at or adjacent the base of reactor 12 to maintain the fluidized bed. Fluidizing stream 20 may depart reactor 12 and circulate through recycle system 14, for example, leaving a top of reactor 12.

As fluidizing stream 20 passes through reactor 12, fluidizing stream 20 may carry entrained particles 26. For example, particles may rise along a height of reactor 12 and leave a top of reactor 12 in departing fluidizing stream 20. Entrained particles 26 may include polymer particles, for example, polymer chains of varying lengths and having a molecular weight distribution. Entrained particles 26 may also include catalyst particles, for example, particles generated from catalyst 18 in reactor 12. For example, a portion of catalyst 18 may be fluidized by fluidizing stream 20, generating catalyst particles. In an aspect, the entrained particles 26 can include polymer particles with polymer chains attached which can continue to grow when the particle is in contact with olefin monomers under polymerization conditions.

As polymerization continues and progresses, entrained particles 26 may settle or be trapped, for example, on surfaces, interfaces, junctions, meshes, or the like, of components of polymerization system 10. In embodiments, entrained particles 26 may tend to settle, gathered, captured, or trapped in fouling-susceptible unit 16, leading to fouling of fouling-susceptible unit 16. Thus, entrained particles 26 may tend to foul fouling-susceptible unit 16.

While a single fouling-susceptible unit 16 is shown in FIG. 1, in other embodiments, recycle system 14 may include more than one fouling-susceptible units. In some such embodiments, the multiple fouling-susceptible units may be the same or different types of units. For example, the at least one fouling-susceptible unit 16 includes one or more of a cyclone, a heat exchanger, a piping section, a piping coupler, a filter, a strainer basket, a liquid-gas separator, a compressor, or a pump. In embodiments, fouling-susceptible unit 16 may not be an additional unit, but may be a portion or section of piping or other flow surfaces of recycle system 14. In embodiments, the at least one fouling-susceptible unit 16 includes at least two fouling-susceptible units. For example, the at least one fouling-susceptible unit 16 may include two, three, four, five, or more fouling-susceptible units.

In embodiments, the fouling may be promoted by continued growth of polymer chains outside reactor 12, for example, in fluidizing stream 20 circulating through recycle system 14. Such growth may arise from catalytic activity associated with catalytic particles of particles 26, or otherwise of catalytically-promoted growth of polymer chains circulating through recycle system 14.

Polymerization system 10 further includes at least one catalyst poison injection location 28 in recycle system 14 and upstream of fouling-susceptible unit 16. In embodiments, the at least one catalyst poison injection location 28 is downstream of reactor 12, in recycle system 14, as shown in FIG. 1.

A catalyst poison 30 may be present at the at least one catalyst poison injection location 28. In embodiments, catalyst poison 30 is continuously introduced into recycle system 14 at the at least one catalyst poison injection location 28. For example, catalyst poison 30 may be fluidized and introduced in a fluidized stream at the at least one catalyst poison injection location 28, or may be introduced as a powder or a particulate at the at least one catalyst poison injection location 28 and get entrained in fluidizing stream 20 passing along the at least one catalyst poison injection location 28. In embodiments, the at least one catalyst poison injection location 28 includes an inlet 32 for injecting a fluidized stream of the catalyst poison 30.

In embodiments, catalyst poison 30 is present in a poison composition 34 applied or retained to an internal surface 36 in recycle system 14 at the at least one catalyst poison injection location. For example, poison composition 34 may be in the form of a coating or paste applied to internal surface 36, or may be held in a basket or container retained and held internally in recycle system at internal surface 36. In embodiments, the basket or container may be offset from internal surface 36 and be suspended in fluidizing stream 20 to expose contents of fluidizing stream 20 to poison 30.

In examples, catalyst poison 30 includes one or more of air, oxygen, nitrogen, water, carbon monoxide, carbon dioxide, nitrous oxide, or an alcohol. In embodiments, catalyst poison 30 includes a combination of oxygen and nitrogen.

Gaseous or vaporized forms of catalyst poison 30 may be intruded continuously, for example, via inlet 32. Solid forms of catalyst poison 30 may be provided as catalyst composition 34.

In some embodiments, the at least one catalyst poison location 28 consists of a single location. Thus, catalyst poison 30 may be introduced in fluidizing stream 20 at no more than one location. While a single catalyst poison injection location 28 is shown in FIG. 1, in other embodiments, more than one catalyst poison injection locations may be present, for example, at multiple locations along recycle system 14. For example, the at least one catalyst poison injection location 28 may include at least two locations. In some embodiments, the at least one catalyst poison injection location 28 includes two, three, four, five, six, or more locations. In some embodiments, the at least one catalyst poison injection location 28 includes less than 10, less than five, less than four, less than three, or only two locations.

In embodiments in which more than one fouling-susceptible units are present, catalyst poison 30 may be present at a single location, or at multiple locations. One, more than one, or all of the single or multiple locations may be upstream or downstream relative to different fouling-susceptible units. For example, catalyst poison 30 may be present at a single location 28, and upstream of a most upstream unit of the at least one fouling-susceptible units.

In embodiments, a number of the catalyst poison injection locations is the same as a number of the fouling-susceptible units. In other embodiments, a number of the catalyst poison locations is less than a number of the fouling-susceptible units. In other embodiments, a number of the catalyst poison locations is more than a number of the fouling-susceptible units.

Because catalyst poison 30 is present, further growth of polymer chains in recycle system 14 downstream of reactor 12 may be inhibited, reduced, or substantially prevented. Accordingly, polymer chains may not grow to an extent that promotes fouling, and thus, fouling may be mitigated in polymerization system 10.

While catalyst poison 30 may be introduced while reactor 12 is operating, in other embodiments, operation of reactor 12 may be suspended when catalyst poison 30 is introduced in recycle system 14. For example, reactor 12 may be intermittently operated and suspended, intervening with periods in which catalyst poison 30 is introduced. In other embodiments, catalyst poison 30 is introduced when no polymerization is actively carried out in reactor 12, for example, to terminate the growth of residual polymer chains that may persist after reactor 12 is shut down.

The polymerization system 10 of FIG. 1 was generally described with reference to reactor 12 and fouling-susceptible unit 16. Further systems are described with reference to systems 10a and 10b of FIGS. 2 and 3. The mitigation of fouling in systems 10a and 10b is generally similar to that performed in system 10 of FIG. 1, as described with reference to FIGS. 2 and 3. Like numbering is used to refer to like elements in FIGS. 1, 2, and 3.

Figure 2:
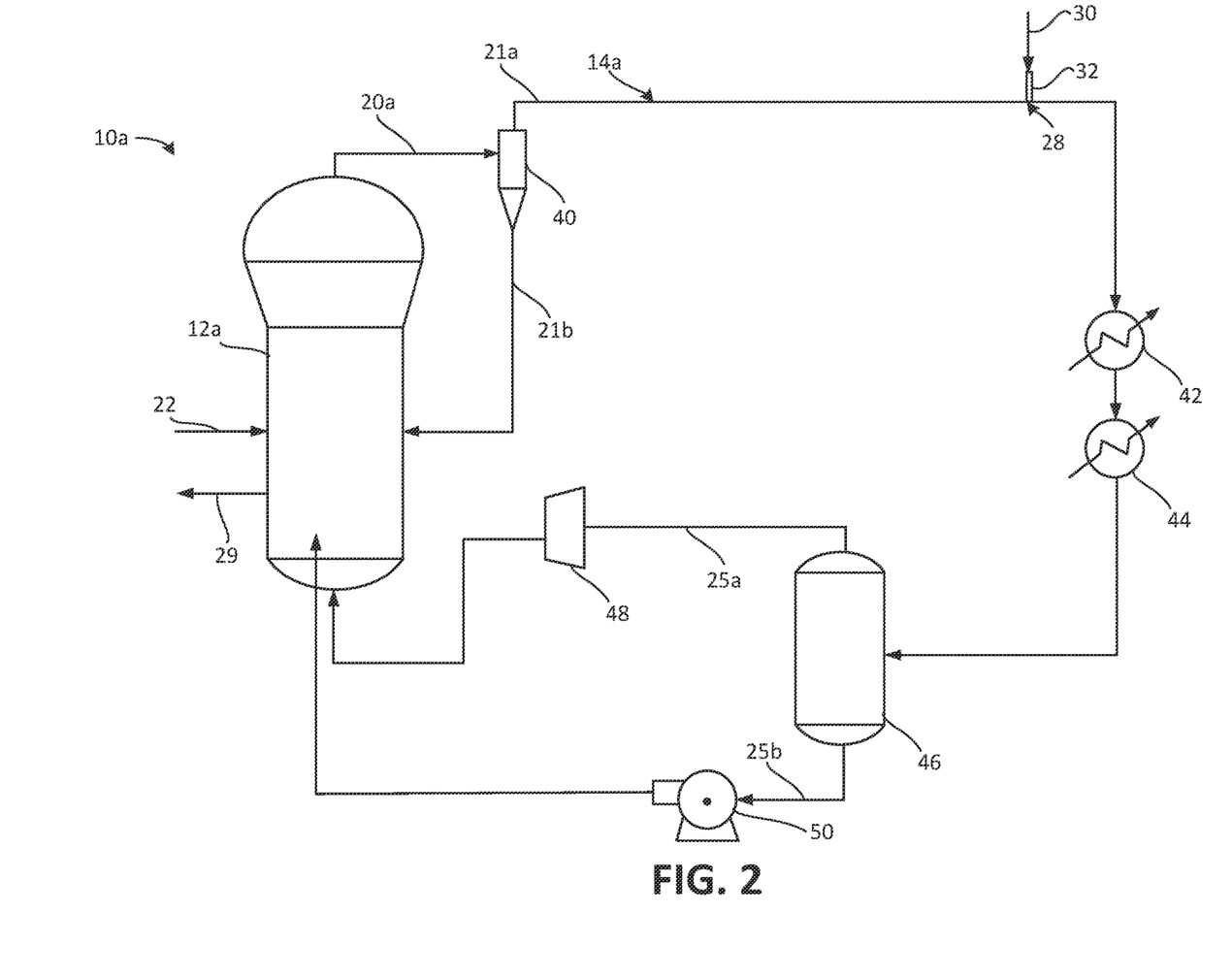
FIG. 2 is a conceptual block diagram of a polymerization system including a fluidized bed reactor coupled to a recycle system, where the recycle system includes a cyclone, a first main loop heat exchanger, a second main loop heat exchanger, a liquid-gas separator, a fluidization compressor, and a liquid injection pump.

FIG. 2 is a conceptual block diagram of a polymerization system 10a including a fluidized bed reactor 12a coupled to a recycle system 14a, where recycle system 14a includes a cyclone 40, a first main loop heat exchanger 42, a second main loop heat exchanger 44, a liquid-gas separator 46, a fluidization compressor 48, and a liquid injection pump 50.

Like reactor 12 of FIG. 1, reactor 12a of FIG. 2 also includes a catalyst (not shown in FIG. 2).

One or more of cyclone 40, a first main loop heat exchanger 42, a second main loop heat exchanger 44, a liquid-gas separator 46, a fluidization compressor 48, and a liquid injection pump 50 may be a fouling-susceptible unit. Thus, fouling may be mitigated in one or more of these components, similar to mitigation of fouling-susceptible unit 10 of FIG. 1. The term fouling-susceptible unit may thus refer to one or more of cyclone 40, first main loop heat exchanger 42, second main loop heat exchanger 44, liquid-gas separator 46, fluidization compressor 48, or liquid injection pump 50.

In embodiments, catalyst poison injection location 28 is upstream of cyclone 40. In embodiments, catalyst poison injection location 28 is downstream of cyclone 40, as shown in FIG. 2. Cyclone 40 may separate fines or particulates from fluidizing stream 20a leaving reactor 12a, for example, particles smaller than a predetermined weight, and generate a first stream 21a ultimately recirculated to reactor 12a through recycle system 14a, and a second stream 21b directly circulated to reactor 12a without substantially passing through recycle system 14a. For example, cyclone 40 may mitigate fouling by removing small particulates that may tend to grow, accumulate, and promote fouling outside of and downstream of reactor 12a within recycle 14a. In embodiments, catalyst poison injection location 28 is immediately downstream of cyclone 40, with no intervening fouling-susceptible unit.

In embodiments, catalyst poison injection location 28 is upstream of a heat exchanger, for example, upstream of first main loop heat exchanger 42, as shown in FIG. 2. In embodiments, catalyst poison injection location 28 is immediately upstream of first main loop heat exchanger 42, with no intervening fouling-susceptible unit. In embodiments, a respective catalyst poison injection location 28 is upstream of each heat exchanger, for example, when more than one heat exchanger is present. In embodiments, a single respective catalyst poison injection location 28 is collectively upstream of all heat exchangers.

In embodiments, catalyst poison injection location 28 is upstream of liquid-gas separator 46. As shown in FIG. 2, liquid-gas separator 46 may separate fluidizing stream 20 (or first stream 21a from fluidizing stream 20) into two streams, a gas stream 25a fed to compressor 48, and a liquid stream 25b fed to pump 50. One or more of these streams may be circulated back to reactor 12a.

While a single catalyst poison injection location 28 is shown in FIG. 2, system 10a of FIG. 2 may include two or more such locations, and these locations may be upstream or downstream relative to one or more components of recycle system 14a, for example, fouling-susceptible units in recycle system 14a.

Figure 3:
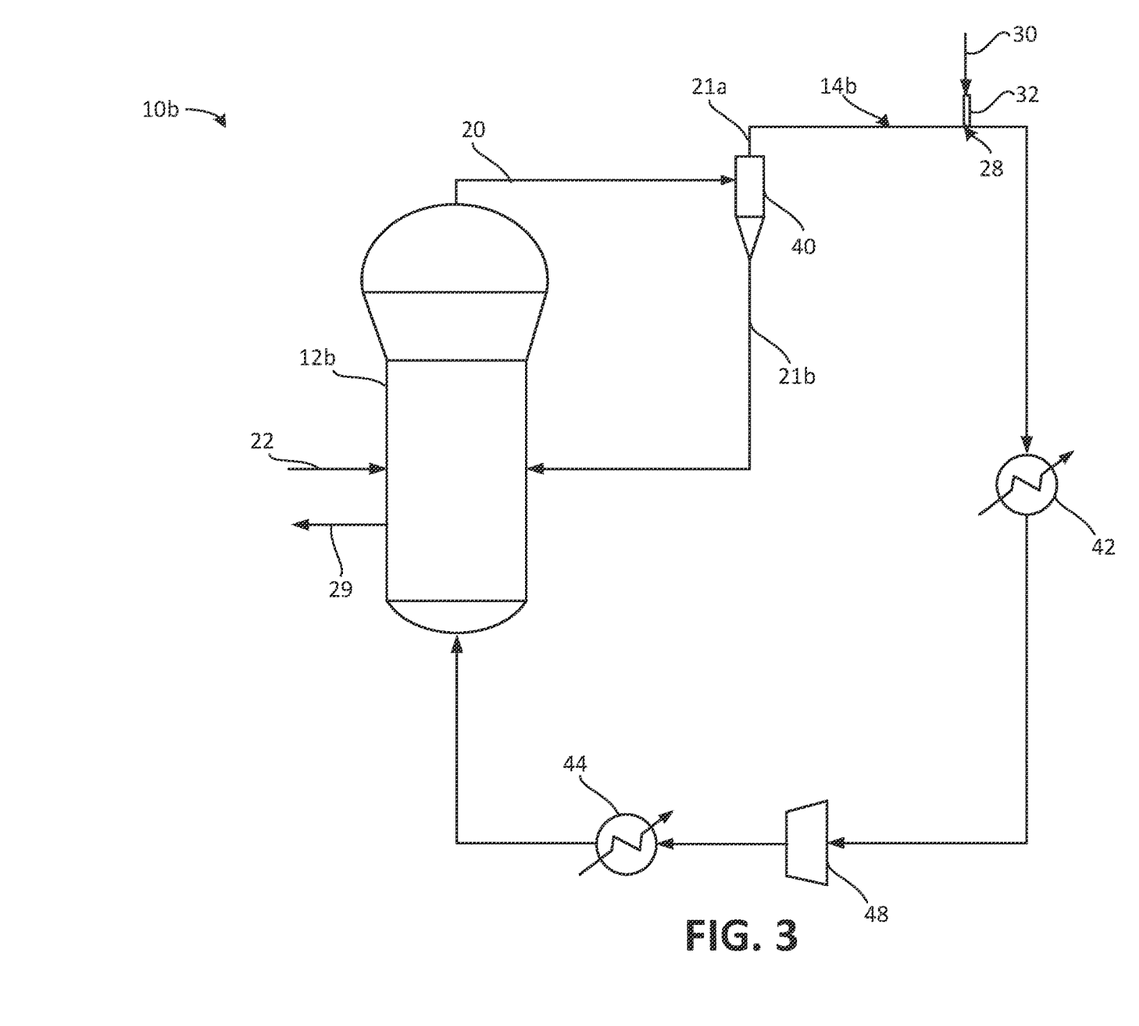
FIG. 3 is a conceptual block diagram of an alternative polymerization system including a fluidized bed reactor coupled to a recycle system, where the recycle system includes a cyclone, a first heat exchanger, a compressor, and a second heat exchanger.

FIG. 3 is a conceptual block diagram of an alternative polymerization system 10b including a fluidized bed reactor 12b coupled to a recycle system 14b, where recycle system 14b includes cyclone 40, first heat exchanger 42, compressor 48, and second heat exchanger 44. In recycle system 14b, compressor 48 is downstream of first heat exchanger 42, and upstream of second heat exchanger 44.

Like reactor 12 of FIG. 1, reactor 12b of FIG. 3 also includes a catalyst (not shown in FIG. 3). The operation of reactor 12b is similar to that described with respect to reactor 12a of FIG. 2.

Similar to system 10a of FIG. 2, cyclone 40 generates streams 21a and 21b from fluidizing stream 20 leaving reactor 12b to reduce fines circulating in recycle system 14b.

While a single catalyst poison injection location 28 is shown in FIG. 3, system 10b of FIG. 3 may include two or more such locations, and these locations may be upstream or downstream relative to one or more components of recycle system 14b, for example, fouling-susceptible units in recycle system 14b.

Figure 4:
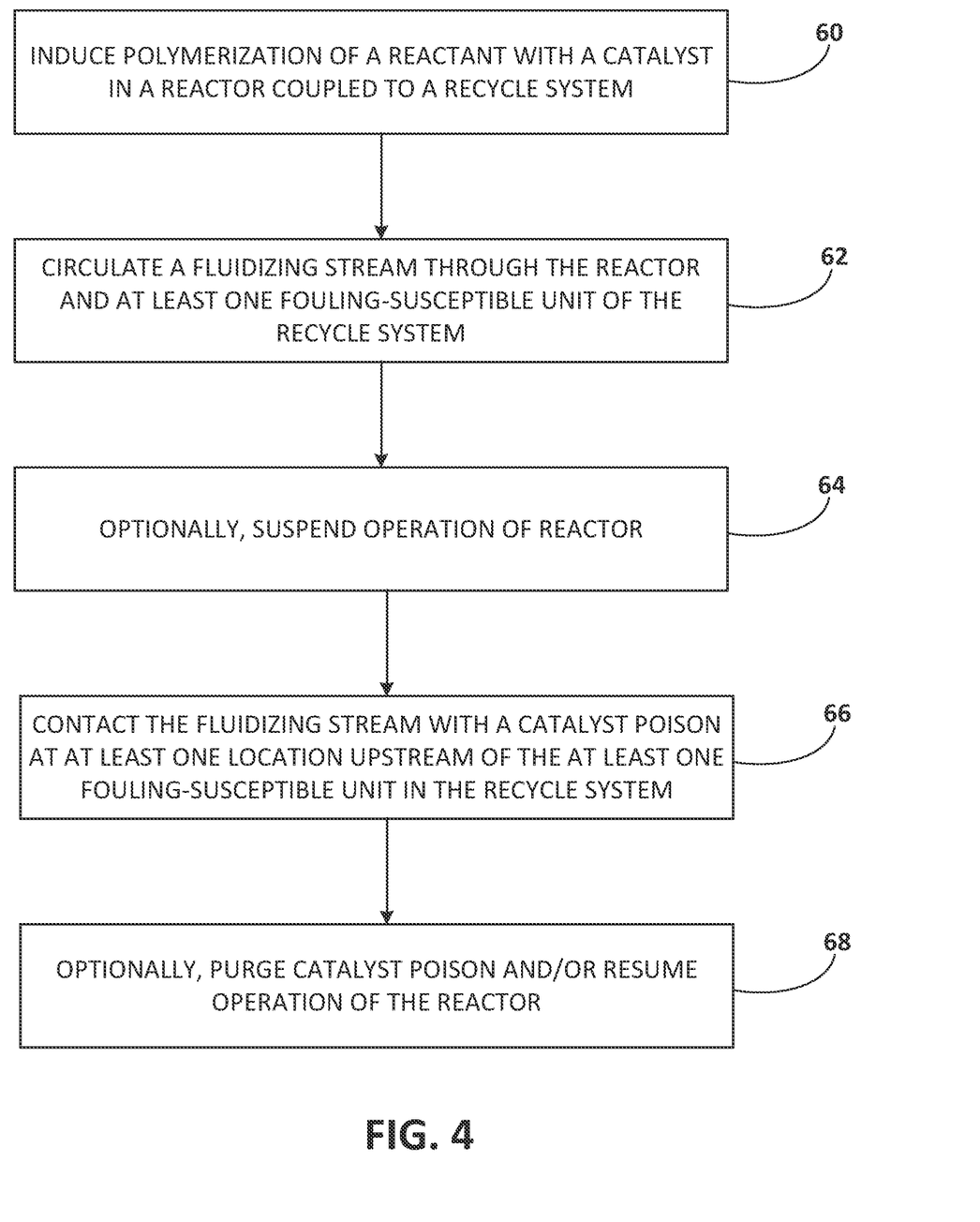
FIG. 4 is a flow diagram illustrating an embodiment of a technique for reducing fouling in a polymerization system including a reactor coupled to a recycle system.

Examples of polymerization systems are described with reference to FIGS. 1 to 3. Turning to FIG. 4, techniques for reducing fouling in polymerization systems are described with reference to the systems of FIGS. 1 to 3 for explanation. However, the technique of FIG. 4 may be performed using any suitable system.

FIG. 4 is a flow diagram illustrating an embodiment of a technique for reducing fouling in polymerization system 10 including reactor 12 coupled to recycle system 14. While the technique of FIG. 4 is described with reference to system 10, reactor 12, and recycle system 14, the technique of FIG. 4 can be performed using like elements of system 10a described with reference to FIG. 2 or system 10b described with reference to FIG. 3.

The technique includes inducing polymerization of a reactant with catalyst 18 in reactor 12 (60). The technique may include withdrawing product stream 29 from reactor 12, including a polymer product. In embodiments, the technique further includes treating product stream 29, for example, in a degassing system.

In embodiments, reactor 12 may be a fluidized bed reactor, for example, reactor 12a of FIG. 2 or 12b of FIG. 3. The technique further includes circulating fluidizing stream 20 through reactor 12 and at least one fouling-susceptible unit 16 of recycle system 14 (62). Fluidizing stream 20 may carry entrained particles 26, for example, particles originating from reactor 12. In embodiments, entrained particles 26 include polymer particles. In embodiments, entrained particles 26 include catalyst particles, for example, particles originating from catalyst 18.

The technique further includes contacting fluidizing stream 20 with catalyst poison 30 at the at least one location 28 upstream of the at least one fouling-susceptible unit 16 in recycle system 14 (66). In embodiments, entrained particles 26 include polymer and catalyst particles, and the contacting fluidizing stream 20 with catalyst poison 30 (66) includes contacting entrained particles 26 with catalyst poison 30. In embodiments, contacting fluidizing stream 20 (66) with catalyst poison 30 includes injecting fluidized stream 32 of catalyst poison 30 at the at least one location 28.

In embodiments, catalyst poison 30 is in coating composition 34 applied to internal surface 36 in recycle system 14 at the at least one location 28. In embodiments, the at least one location 28 is within recycle system 14. In embodiments, at least one location 28 consists of a single location. In embodiments, the single location is upstream of a most upstream unit of the at least one fouling-susceptible unit 16. In embodiments, at least one location 28 includes at least two locations. In embodiments, at least one fouling-susceptible unit 16 includes at least two fouling-susceptible units. In embodiments, a number of the locations 28 is the same as a number of the fouling-susceptible units 16. In embodiments, a number of the locations 28 is less than a number of the fouling-susceptible units 16. In embodiments, the at least one location 28 includes two, three, four, five, or six locations.

In embodiments, the contacting (66) includes contacting catalyst poison 30 with fluidizing stream 20 upstream of cyclone 40. In embodiments, the contacting (66) includes contacting catalyst poison 30 with fluidizing stream 20 downstream of cyclone 40 (for example, with stream 21a). In embodiments, the contacting (66) includes contacting catalyst poison 30 with fluidizing stream 20 upstream of a heat exchanger, for example, with stream 21a upstream of one or both of first main loop heat exchanger 42 or second main loop heat exchanger 44. In embodiments, the contacting (66) includes contacting catalyst poison 30 with fluidizing stream 20 upstream of liquid-gas separator 46.

In embodiments, the contact (66) includes contacting catalyst poison 30 with fluidizing stream 20 in an amount which is completely consumed in recycle system 14. Thus, when fluidizing stream 20 is circulated back to reactor 12, substantially no poison 30 may be introduced by fluidizing stream 20 into reactor 12. In embodiments, the contacting (66) includes contacting catalyst poison 30 with fluidizing stream 20 in an amount which is incompletely consumed in recycle system 14. Thus, when fluidizing stream 20 is circulated back to reactor 12, at least some poison 30 may be introduced by fluidizing stream 20 into reactor 12, for example, a fluidized portion of poison 30.

In embodiments, the technique of FIG. 4 is conducted in the absence of any step to deactivate catalyst poison 30.

In embodiments, catalyst poison 30 includes one or more of air, oxygen, nitrogen, water, carbon monoxide, carbon dioxide, nitrous oxide, or an alcohol. In embodiments, catalyst poison 30 is in catalyst poison composition 34 which includes oxygen and nitrogen.

In embodiments, at least one fouling-susceptible unit 16 includes one or more of cyclone 40, a heat exchanger 42 or 44, a piping section, a piping coupler, a filter, a strainer basket, liquid-gas separator 46, compressor 38, or pump 50.

In embodiments, the technique of FIG. 4 may optionally include, suspending polymerization of reactant over catalyst 18 in reactor 12, for example, to stop generating product 29 (64). In some such embodiments, the contacting (66) is performed during the suspension (64) or after the suspension (64). In some such embodiments, the technique of FIG. 4 optionally includes, after the contacting, purging unconsumed catalyst poison from the system (68). In some such embodiments, the technique of FIG. 4 optionally includes, after the purging, restarting polymerization of the reactant in reactor 12 (68).

Thus, systems and techniques according to the disclosure can be used to mitigate, reduce, inhibit, or substantially prevent fouling in one or more fouling-susceptible units in a polymerization system.

Aspects

Aspect 1. A method for reducing fouling in a polymerization system comprising a reactor coupled to a recycle system, the recycle system comprising at least one fouling-susceptible unit, the method comprising:
  inducing polymerization of a reactant with a catalyst in the reactor;
  circulating a fluidizing stream through the reactor and the at least one fouling-susceptible unit of the recycle system, the fluidizing stream comprising entrained particles; and
  contacting the fluidizing stream with a catalyst poison at at least one location upstream of the at least one fouling-susceptible unit in the recycle system.

Aspect 2. The method of Aspect 1, wherein the reactor is a fluidized bed reactor.

Aspect 3. The method of Aspects 1 or 2, wherein the entrained particles comprise polymer particles.

Aspect 4. The method of any of Aspects 1 to 3, wherein the entrained particles comprise catalyst particles.

Aspect 5. The method of any of Aspects 1 to 4, wherein the entrained particles comprise polymer and catalyst particles, and wherein the contacting the fluidizing stream with a catalyst poison comprises contacting the entrained particles with the catalyst poison.

Aspect 6. The method of any of Aspects 1 to 5, wherein the contacting the fluidizing stream with the catalyst poison comprises injecting a fluidized stream of the catalyst poison at the at least one location.

Aspect 7. The method of any of Aspects 1 to 6, wherein the catalyst poison is in a coating composition applied to an internal surface in the recycle system at the at least one location.

Aspect 8. The method of any of Aspects 1 to 7, wherein the at least one location is within the recycle system.

Aspect 9. The method of any of Aspects 1 to 8, wherein the at least one fouling-susceptible unit comprises at least two fouling-susceptible units.

Aspect 10. The method of any of Aspects 1 to 9, wherein the at least one location consists of a single location.

Aspect 11. The method of Aspect 10, wherein the single location is upstream of a most upstream unit of the at least one fouling-susceptible units.

Aspect 12. The method of Aspect 9, wherein the at least one location comprises at least two locations.

Aspect 13. The method of Aspect 9, wherein a number of the locations is the same as a number of the fouling-susceptible units.

Aspect 14. The method of Aspect 9, wherein a number of the locations is less than a number of the fouling-susceptible units.

Aspect 15. The method of Aspect 9, wherein the at least one location comprises two, three, four, five, or six locations.

Aspect 16. The method of any of Aspects 1 to 15, wherein the catalyst poison contacts the fluidizing stream upstream of a cyclone.

Aspect 17. The method of any of Aspects 1 to 16, wherein the catalyst poison contacts the fluidizing stream downstream of a cyclone.

Aspect 18. The method of any of Aspects 1 to 17, wherein the catalyst poison contacts the fluidizing stream upstream of a heat exchanger.

Aspect 19. The method of any of Aspects 1 to 18, wherein the catalyst poison contacts the fluidizing stream upstream of a liquid-gas separator.

Aspect 20. The method of any of Aspects 1 to 19, wherein the catalyst poison is contacted with the fluidizing stream in an amount which is completely consumed in the recycle system.

Aspect 21. The method of any of Aspects 1 to 20, wherein the catalyst poison is contacted with the fluidizing stream in an amount which is incompletely consumed in the recycle system.

Aspect 22. The method of any of Aspects 1 to 21, wherein the method for reducing fouling in a polymerization system is conducted in the absence of any step to deactivate the poison.

Aspect 23. The method of any of Aspects 1 to 22, wherein the catalyst poison comprises one or more of air, oxygen, nitrogen, water, carbon monoxide, carbon dioxide, nitrous oxide, or an alcohol.

Aspect 24. The method of any of Aspects 1 to 23, wherein the catalyst poison is in a catalyst poison composition which comprises oxygen and nitrogen.

Aspect 25. The method of any of Aspects 1 to 24, wherein the at least one fouling-susceptible unit comprises one or more of a cyclone, a heat exchanger, a piping section, a piping coupler, a filter, a strainer basket, a liquid-gas separator, a compressor, or a pump.

Aspect 26. A method for reducing fouling in a polymerization system according to any of Aspects 1 to 25, the method further comprising:
  suspending polymerization of a reactant over a catalyst in the reactor; and
  during the suspension, contacting the fluidizing stream with a catalyst poison at at least one location upstream of the at least one fouling-susceptible unit in the recycle system.

Aspect 27. The method of claim 26, further comprising, after the contacting:
  purging unconsumed catalyst poison from the system; and
  after the purging, restarting polymerization of the reactant in the reactor.

Aspect 28. A method for reducing fouling in a polymerization system comprising a fluidized bed reactor coupled to a recycle system, the recycle system comprising at least one fouling-susceptible unit, the method comprising:
  inducing polymerization of a reactant with a catalyst in the fluidized bed reactor;
  circulating a fluidizing stream through the fluidized bed reactor and the at least one fouling-susceptible unit, the fluidizing stream comprising entrained polymer and catalyst particles tending to foul the least one fouling-susceptible unit; and
  contacting the entrained particles with a catalyst poison in at least one location upstream of the at least one fouling-susceptible unit in the recycle system.

Aspect 29. A polymerization system comprising:
  a reactor comprising a catalyst, the reactor being configured to induce polymerization of a reactant with the catalyst;
  a recycle system comprising at least one fouling-susceptible unit, the recycle system being coupled to the reactor, the recycle system being configured to circulate a fluidizing stream through the reactor and the at least one fouling-susceptible unit, the fluidizing stream comprising entrained particles; and
  at least one catalyst poison injection location in the recycle system and upstream of the fouling-susceptible unit.

Aspect 30. The system of Aspect 29, wherein the reactor is a fluidized bed reactor.

Aspect 31. The system of Aspects 29 or 30, wherein the entrained particles comprise polymer particles.

Aspect 32. The method of any of Aspects 29 to 31, wherein the entrained particles comprise catalyst particles.

Aspect 33. The system of any of Aspects 29 to 32, wherein the at least one catalyst poison injection location comprises an inlet for injecting a fluidized stream of a catalyst poison.

Aspect 34. The system of any of Aspects 29 to 33, wherein a poison composition is applied to an internal surface in the recycle system at the at least one catalyst poison injection location.

Aspect 35. The system of any of Aspects 29 to 34, wherein the at least one catalyst poison injection location is downstream of the reactor.

Aspect 36. The system of any of Aspects 29 to 35, wherein the at least one fouling-susceptible unit comprises at least two fouling-susceptible units.

Aspect 37. The system of any of Aspects 29 to 36, wherein the at least one catalyst poison location consists of a single location.

Aspect 38. The system of Aspect 37, wherein the single location is upstream of a most upstream unit of the at least one fouling-susceptible units.

Aspect 39. The system of Aspect 36, wherein the at least one catalyst poison injection location comprises at least two locations.

Aspect 40. The system of Aspect 36, wherein the at least one catalyst poison injection location comprises two, three, four, five, or six locations.

Aspect 41. The system of Aspect 39, wherein a number of the catalyst poison injection locations is the same as a number of the fouling-susceptible units.

Aspect 42. The system of Aspect 39, wherein a number of the catalyst poison locations is less than a number of the fouling-susceptible units.

Aspect 43. The system of any of Aspects 29 to 42, wherein the catalyst poison injection location is upstream of a cyclone.

Aspect 44. The system of any of Aspects 29 to 43, wherein the catalyst poison injection location is downstream of a cyclone.

Aspect 45. The system of any of Aspects 29 to 44, wherein the catalyst poison injection location is upstream of a heat exchanger.

Aspect 46. The system of any of Aspects 29 to 45, wherein the catalyst poison injection location is upstream of a liquid-gas separator.

Aspect 47. The system of any of Aspects 29 to 46, wherein the catalyst poison comprises one or more of air, oxygen, nitrogen, water, carbon monoxide, carbon dioxide, nitrous oxide, or an alcohol.

Aspect 48. The system of any of Aspects 29 to 47, wherein the catalyst poison comprises a combination of oxygen and nitrogen.

Aspect 49. The system of any of Aspects 29 to 48, wherein the at least one fouling-susceptible unit comprises one or more of a cyclone, a heat exchanger, a piping section, a piping coupler, a filter, a strainer basket, a liquid-gas separator, a compressor, or a pump.

Aspect 50. A polymerization system comprising:
a fluidized bed reactor comprising a catalyst, the fluidized bed reactor being configured to induce polymerization of a reactant with the catalyst;
a recycle system comprising at least one fouling-susceptible unit, the recycle system being coupled to the fluidized bed reactor, the recycle system being configured to circulate a fluidizing stream through the fluidized bed reactor and the at least one fouling-susceptible unit, the fluidizing stream comprising entrained polymer and catalyst particles tending to foul the at least one fouling-susceptible unit; and
at least one catalyst poison injection location in the recycle system and upstream of the fouling-susceptible unit.

The disclosure is described above with reference to numerous aspects and embodiments. Many variations will suggest themselves to those skilled in the art in light of the above detailed description. All such obvious variations are within the full intended scope of the appended claims. Other aspects of the disclosure can include, but are not limited to, the following aspects. Many aspects are described as "comprising" certain components or steps, but alternatively, can "consist essentially of" or "consist of" those components or steps unless specifically stated otherwise.

We claim:

1. A method for reducing fouling in a polymerization system comprising a reactor coupled to a recycle system, the recycle system comprising at least one fouling-susceptible unit, the method comprising:
   inducing polymerization of a reactant with a catalyst in the reactor;
   circulating a fluidizing stream through the reactor and the at least one fouling-susceptible unit of the recycle system, the fluidizing stream comprising entrained particles;
   suspending polymerization of the reactant over the catalyst; and
   during the suspension, contacting the fluidizing stream with a catalyst poison at at least one location upstream of the at least one fouling-susceptible unit in the recycle system.

2. The method of claim 1, wherein the reactor is a fluidized bed reactor.

3. The method of claim 1, wherein the entrained particles comprise polymer and catalyst particles, and wherein the contacting the fluidizing stream with the catalyst poison comprises contacting the entrained particles with the catalyst poison.

4. The method of claim 1, wherein the contacting the fluidizing stream with the catalyst poison comprises injecting a fluidized stream of the catalyst poison at the at least one location.

5. The method of claim 1, wherein the catalyst poison is in a coating composition applied to an internal surface in the recycle system at the at least one location.

6. The method of claim 1, wherein the catalyst poison is contacted with the fluidizing stream in an amount which is completely consumed in the recycle system.

7. The method of claim 1, wherein the method for reducing fouling in the polymerization system is conducted in the absence of deactivating the catalyst poison.

8. The method of claim 1, wherein the catalyst poison comprises one or more of air, oxygen, nitrogen, water, carbon monoxide, carbon dioxide, nitrous oxide, or an alcohol.

9. The method of claim 8, wherein the catalyst poison is a combination of oxygen and nitrogen.

10. The method of claim 1, wherein the at least one fouling-susceptible unit comprises one or more of a cyclone, a heat exchanger, a piping section, a piping coupler, a filter, a strainer basket, a liquid-gas separator, a compressor, or a pump.

11. The method of claim 1, further comprising, after the contacting:
    purging unconsumed catalyst poison from the system; and
    after the purging, restarting polymerization of the reactant in the reactor.

12. A method for reducing fouling in a polymerization system comprising a reactor coupled to a recycle system, the recycle system comprising at least one fouling-susceptible unit, the method comprising:
    inducing polymerization of a reactant with a catalyst in the reactor;
    circulating a fluidizing stream through the reactor and the at least one fouling-susceptible unit of the recycle system, the fluidizing stream comprising entrained particles;
    contacting the fluidizing stream with a catalyst poison at at least one location upstream of the at least one fouling-susceptible unit in the recycle system;
    suspending polymerization of the reactant over the catalyst;
    purging unconsumed catalyst poison from the system; and
    after the purging, restarting polymerization of the reactant in the reactor.

13. The method of claim 12, wherein the reactor is a fluidized bed reactor.

14. A polymerization system comprising:
    a reactor comprising a catalyst, the reactor being configured to induce polymerization of a reactant with the catalyst;
    a recycle system comprising at least one fouling-susceptible unit, the recycle system being coupled to the reactor, the recycle system being configured to circulate a fluidizing stream through the reactor and the at least one fouling-susceptible unit, the fluidizing stream comprising entrained particles; and
    at least one catalyst poison injection location in the recycle system and upstream of the fouling-susceptible unit, wherein the at least one catalyst poison injection location is capable of injecting a catalyst poison to an internal surface of the recycle system.

15. The system of claim 14, wherein the reactor is a fluidized bed reactor.

16. The system of claim 14, wherein the at least one catalyst poison injection location comprises an inlet for injecting a fluidized stream of the catalyst poison.

17. The system of claim 14, wherein the at least one catalyst poison injection location is downstream of the reactor.

18. The system of claim 14, wherein the catalyst poison comprises one or more of air, oxygen, nitrogen, water, carbon monoxide, carbon dioxide, nitrous oxide, or an alcohol.

19. The system of claim 14, wherein the at least one fouling-susceptible unit comprises one or more of a cyclone, a heat exchanger, a piping section, a piping coupler, a filter, a strainer basket, a liquid-gas separator, a compressor, or a pump.

20. The system of claim 19, wherein the at least one fouling-susceptible unit is the heat exchanger.

\* \* \* \* \*